United States Patent [15] 3,636,770
Chaney [45] Jan. 25, 1972

[54] CANDY THERMOMETER

[72] Inventor: John L. Chaney, Lake Geneva, Wis. 53147

[22] Filed: June 22, 1970

[21] Appl. No.: 48,378

[52] U.S. Cl. ............................................. 73/376, 206/16.5
[51] Int. Cl. ........................................ G01k 1/16, G01k 5/04
[58] Field of Search .................... 73/374, 376, 378; 206/16.5

[56] References Cited

UNITED STATES PATENTS

| 1,995,470 | 3/1935 | Chaney | 73/378 |
| 2,072,441 | 3/1937 | Cameron | 73/374 X |
| 1,983,166 | 12/1934 | Chaney et al. | 73/374 X |
| 3,528,292 | 9/1970 | Maynard | 73/374 |
| 2,651,203 | 9/1953 | Lamb | 73/374 |
| 2,612,046 | 9/1952 | Crawley | 73/376 |
| 1,646,914 | 10/1927 | Kashiwagi | 73/376 |

Primary Examiner—Louis R. Prince
Assistant Examiner—Daniel M. Yasich
Attorney—Marechal, Biebel, French & Bugg

[57] ABSTRACT

A candy thermometer in which the thermometer bulb is held in heat transfer relation with the lower end of the protective tube by resilient means, eliminating the use of the usual tin anchor and making the thermometer and its card replaceable.

3 Claims, 4 Drawing Figures

PATENTED JAN 25 1972
3,636,770
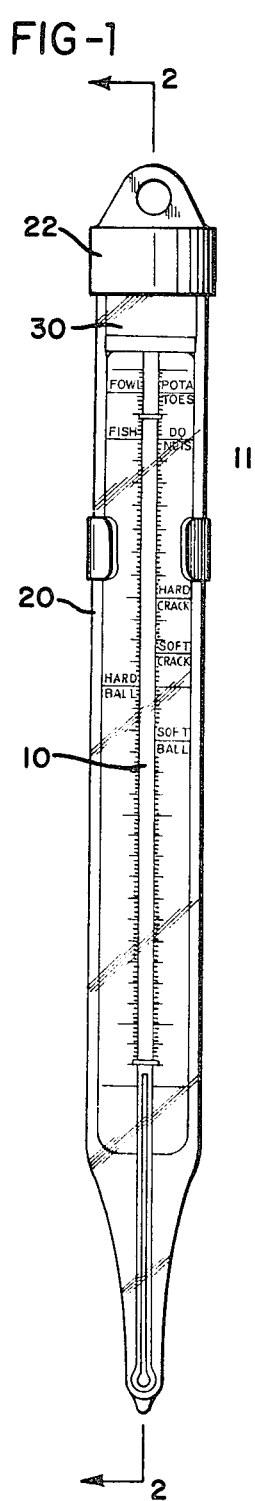
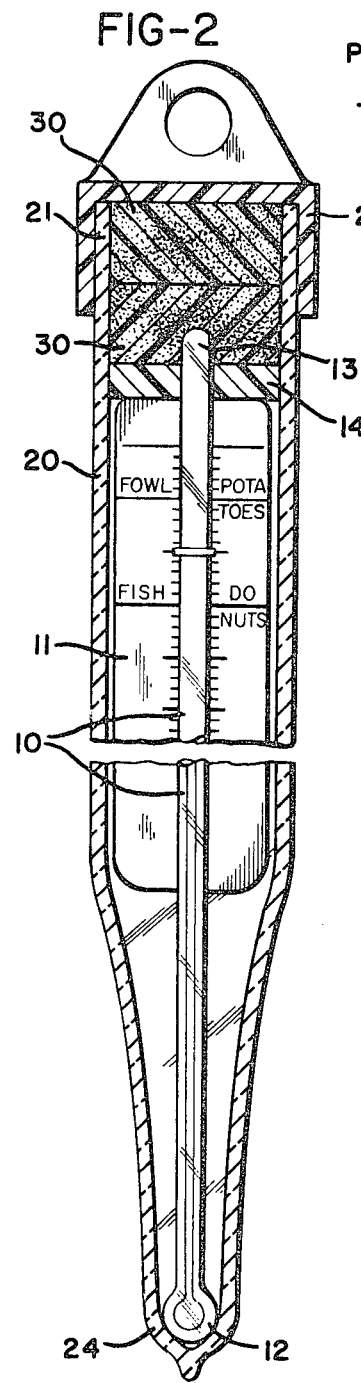
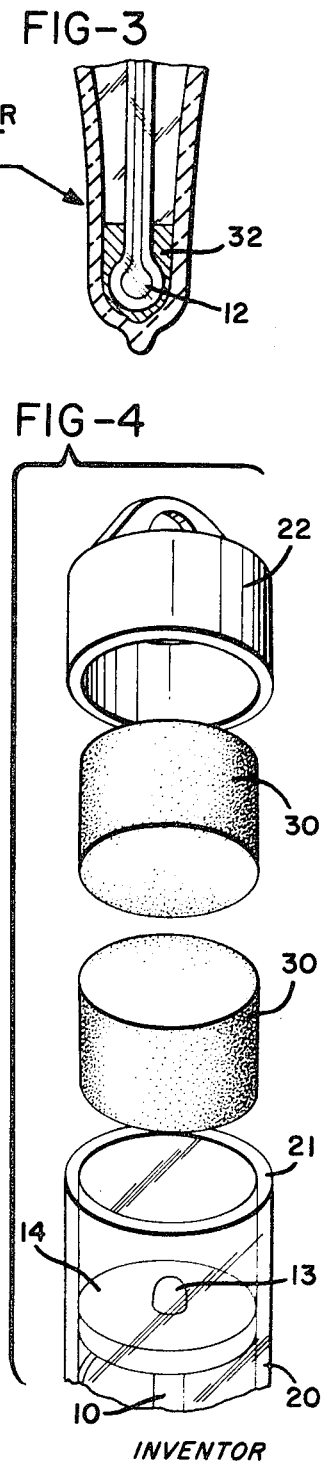
INVENTOR
JOHN L. CHANEY
BY
Marechal, Biebel, French & Bugg
ATTORNEYS

CANDY THERMOMETER

BACKGROUND OF THE INVENTION

A conventional candy thermometer, also used for deep fat cooking, consists of a graduated scale card to which the thermometer tube is fastened. The tube and scale card are then placed in an outer protective tube which is closed so that the thermometer can be washed after use. The bulb of the thermometer tube is fastened to the lower end of the protective tube by a drop of solder called a tin anchor, usually consisting of 50 percent tin and 50 percent lead. The tin anchor serves the purpose of making for good heat transfer between the outer tube and the thermometer bulb and also anchors the thermometer in fixed position. However it adds to the cost of the thermometer.

SUMMARY OF THE INVENTION

In accordance with the present invention the tin anchor is eliminated, thus reducing expense, and the thermometer tube and card are maintained in good heat transfer relation with the bottom of the protective tube by a resilient member which exerts a continuing gentle pressure on the card to thus retain the bulb of the thermometer in close heat transfer contact with the bottom end of the protective tube.

BRIEF DESCRIPTION OF THE DRAWINGS

FIG. 1 is a front view of the complete thermometer in accordance with the present invention;

FIG. 2 is a broken view along line 2—2 of FIG. 1 on a larger scale;

FIG. 3 is a fragmentary view showing the conventional tin anchor construction; and FIG. 4 is an exploded view showing the cap and the resilient elements at the upper end of the card.

DESCRIPTION OF THE PREFERRED EMBODIMENT

The invention comprises a thermometer tube 10 fastened to a scale card 11 which contains the graduations and in some cases indications of proper temperature to cook various items. The thermometer tube 10 has a bulb 12 at its lower end. The upper end 13 of the tube 10 projects above the scale card and a disk 14 usually of plastic or the like fits over the upper end of the tube.

The outer protective tube is shown at 20 having an open upper end 21 which however is sealed by a plastic cap 22 frictionally held in position thereon. This feature is shown and claimed in my copending application Ser. No. 23,815 filed Mar. 30, 1970. A metal clip 23 on the tube is used to support the thermometer on the wall of a cooking pan.

Since disk 14 is only slightly less in diameter than the internal diameter of tube 20, it will function to guide the thermometer and its card and keep it centrally located with respect to the tube 20. Also it will be seen from FIG. 2 that the bulb 12 of the thermometer rests against the lower inner end 24 of protective tube 20 and is generally similar in shape so that a substantial area of contact can be maintained.

In order to establish good heat transfer contact a resilient member 30 is placed between the disk 14 and the head of cap 22. This may be either a single piece of porous elastomeric material, such as open cell polyurethane foam, or it may be made up of two such cylindrical pieces as illustrated in FIG. 2. The axial length of the member, whether of one or more pieces, is such that with the cap 21 in normal closed position, the material is under compression and partially collapses. This develops and maintains a light pressure between cap 22 and the disk 14 which is transmitted through the card to bulb 12, such as to hold it in good heat transfer contact with the inner surface 24 of tube 20. It likewise holds the thermometer tube and card firmly against internal movement during use or when it is being handled.

As shown in FIG. 3 the lower end of bulb 12 is fastened in place by means of tin anchor 32 in the conventional way which means that even with a removable cap such as 22, it is not possible to readily remove and replace the thermometer and card as can be done with the present invention.

While the form of device herein described constitutes a preferred embodiment of the invention it is to be understood that the invention is not limited to this precise form and that changes may be made therein without departing from the scope of the invention which is defined in the appended claims.

What is claimed is:

1. A candy thermometer having a lower end adapted to be immersed in the liquid being heated comprising a graduated scale card, a thermometer tube fastened in place on said scale card and having a heat-sensitive bulb at its lower end extending beyond said scale card, a centering disk on the upper end of said thermometer tube adapted to contact the upper end of said scale card, a protective glass tube enclosing said card and said thermometer tube and preventing access of the liquid being heated to the scale card and thermometer tube, said protective tube having a closed bottom end tapering to an internal diameter approximately that of the outer diameter of said bulb, said protective tube having an open top end, a cap closing said open top end of said protective tube, and a resilient element compressed between said cap and said disk adapted to maintain light pressure on the top of said card to thereby retain said thermometer bulb in close contact and good heat transfer relation with the tapered lower end of said protective tube.

2. The thermometer of claim 1 in which said cap is made of plastic material and is frictionally received on the upper end of said tube providing for removal and replacement of said thermometer tube and scale card.

3. The thermometer of claim 1 in which said resilient element is a pad of porous compressible elastomeric material.

* * * * *